J. G. Murdock,
Hydrant.
No. 3434.
Reissued May 11. 1869.
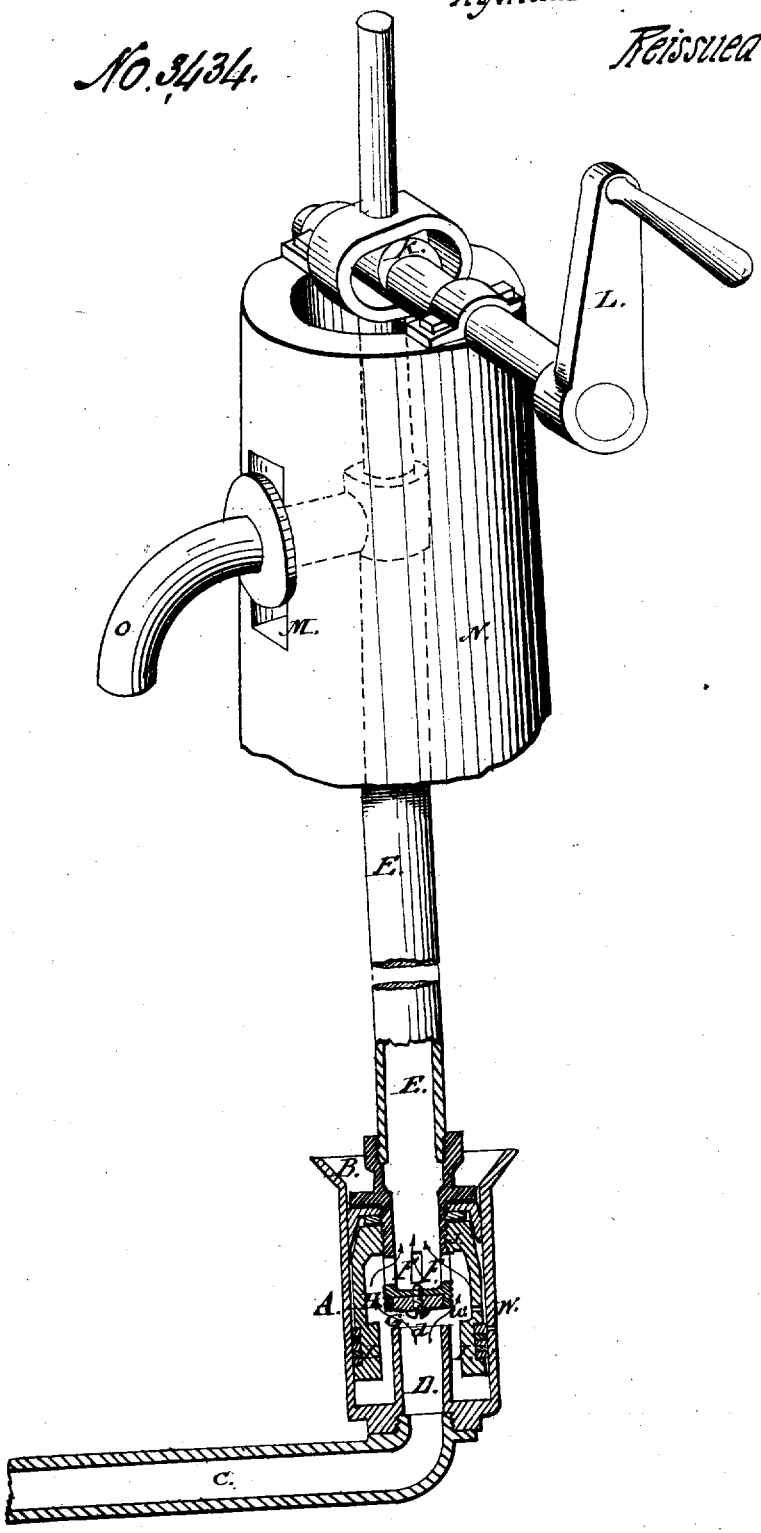
N. PETERS, PHOTO-LITHOGRAPHER, WASHINGTON, D. C.

UNITED STATES PATENT OFFICE.

JOHN G. MURDOCK, OF CINCINNATI, OHIO.

IMPROVEMENT IN HYDRANTS.

Specification forming part of Letters Patent No. 38,694, dated May 26, 1863; Reissue No. 3,434, dated May 11, 1869.

*To all whom it may concern:*

Be it known that I, JOHN G. MURDOCK, of Cincinnati, Hamilton county, Ohio, have invented a new and useful Improvement in Hydrants, of which the following is a full, clear, and exact description, reference being had to the accompanying drawing, making part of this specification.

The subject of my invention is a convenient and effective form of hydrant, having a moving hollow plunger, which forms a water-way in the open condition of the hydrant and a valve in the closed condition thereof, the said plunger shutting against the pressure, and being wholly external to the chamber which it closes, and being capable of removal for inspection or repair without disturbing the chamber.

In the accompanying drawing the upper and lower portions of a hydrant embodying my improvements are represented, respectively, by a perspective view and vertical section.

A is the receiving chamber or barrel, terminating in an open flaring top or rim, B.

W is a waste, aperture through the side of the barrel.

C is the supply-pipe, terminating in the chamber D, which preferably rises a short distance into the interior of the barrel, and whose summit constitutes the seat *d* of the plunger-valve.

E is a hollow rod or pipe, which performs the double function of plunger and water-way, is closed at bottom to form a valve, and perforated at F, near its lower end, for the ascent of the water into and through it. The bottom of the plunger may be furnished with a gum or leather pad, G. The pipe E is also provided with a piston-head, H, in the form of an inverted cup, and having leather or other suitable gaskets, I J.

*W* is a waste-aperture in the head H, which aperture, when the piston is depressed, communicates with the aperture W in the side of the barrel. The described hollow plunger H constitutes, with its rod E and discharge-nozzle O, my moving water-way. The plunger may be operated by means of a cam or eccentric, K, upon the handle L, or by any other suitable device. A slot, M, in the stock N, permits the slight play of the spout or discharge-nozzle O incident to the operation of the hydrant. The hydrant is opened by raising the handle to the position represented, so as to lift the valve G off of the valve-seat *d*, and to allow the water to rush into the moving water-way H E O, as indicated by the arrows. The instant that the water-way is lifted the lower gasket, I, covers and closes the waste-aperture W, while the upper gasket or cup-packing, J, serves to prevent the escape of any water out through the open top of the barrel A while the hydrant is open. The act of closing the hydrant, exposing the ventage W, allows the contents of the hydrant to escape. The spout and handle being unshipped, the water-way or plunger may be readily withdrawn for inspection or repair without disturbing the chamber D, said plunger and valve being wholly external thereto.

I have selected for illustration a form proven effective in practice, but may modify the same in various ways. For example, the lower end of the hollow plunger may be simply ground to fit the valve-seat, the impinging surfaces being conical or otherwise; or the pad G may be replaced by one upon the seat *d*.

My invention is particularly designed for the class known as wasting-hydrants, but is also applicable to others.

I am aware that hydrants have been constructed with a hollow piston-rod, which had also served as a water-way for the conveyance of water to the discharge-nozzle; but in such cases the piston has always been constructed so as to close in the direction of the flow of water, thereby causing undue concussion from the reaction of the water at the moment the valve reaches its seat, thus endangering the pipe from the sudden pressure; and such hydrants are also objectionable, because after they have been once sunk the plunger cannot be again removed without at the same time removing the valve-chamber or digging up the entire hydrant, whereas in my form the moving plunger or water-way closes in a direction contrary to that of the flow of water, thus entirely preventing any reaction or resultant injury to the valve or to the supply-pipes, and, being entirely external to the supply or valve chamber, is adapted to be readily removed when desired without disturbing said chamber.

I claim herein as new and of my invention—

1. In combination with the valve-seated supply pipe or chamber D *d*, the moving water-way and plunger E F, wholly external to said chamber and shutting against the pressure.

2. A wasting-hydrant having the described hollow plunger and moving water-way shutting against the pressure, in combination with a valve-seated supply pipe or chamber, as set forth.

3. The wasting open-mouthed barrel A B W, valve seat *d*, valve G, gaskets I J, and vantage *w*, combined in the manner described with a moving water-way shutting against the pressure, substantially as and for the purposes set forth.

In testimony of which invention I hereunto set my hand.

JOHN G. MURDOCK.

Witnesses:
GEORGE H. KNIGHT,
JAMES H. LAYMAN.